March 11, 1969 D. R. CARR 3,432,135
SUBREFLECTOR-POSITIONING MECHANISM
Filed Dec. 29, 1966
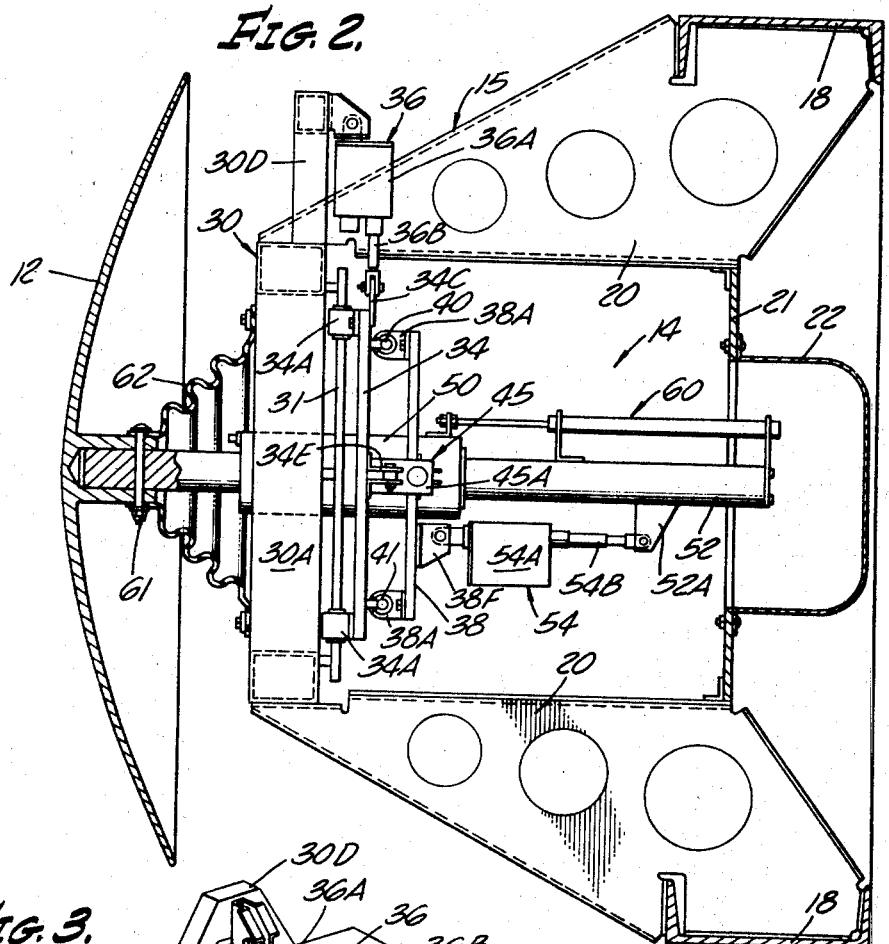
FIG. 2.
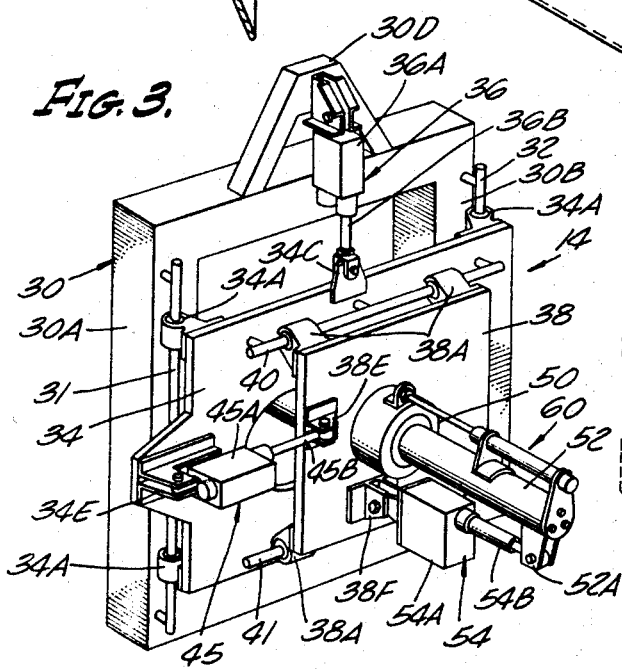
FIG. 3.
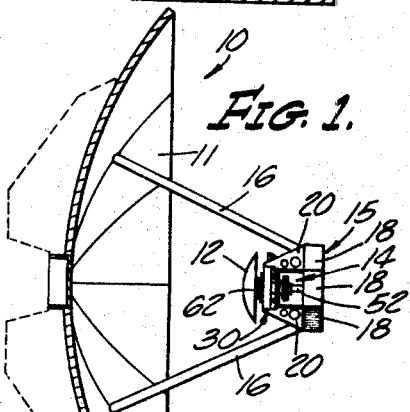
FIG. 1.
INVENTOR.
DONALD R. CARR
BY 
ATTORNEYS United States Patent Office 3,432,135
Patented Mar. 11, 1969

3,432,135
SUBREFLECTOR-POSITIONING MECHANISM
Donald R. Carr, Lemon Grove, Calif., assignor to Whittaker Corporation, a corporation of California
Filed Dec. 29, 1966, Ser. No. 605,787
U.S. Cl. 248—287
Int. Cl. A47f 5/00; A47h 1/10; F16m 13/00
3 Claims

ABSTRACT OF THE DISCLOSURE

A subreflector is accurately positioned with respect to a large main parabolic reflector using electrical linear actuators for positioning such subreflector in any one of three mutually perpendicular directions. The subreflector is mounted on a shaft extending through a cylindrical bearing on a plate. The plate is slidably mounted on a second plate structure which in turn is slidably mounted on an open frame, this second plate structure and frame being apertured to accommodate the previously mentioned bearing and shaft. A first linear actuator is between the shaft and the first plate. A second linear actuator is between the first and second plates and a third linear actuator is between the frame and second plate so as to provide independent adjustment in any one of three mutually perpendicular directions.

---

The present invention relates to improved means and techniques for the positioning of objects and has particular usefulness in the accurate positioning of a subreflector with respect to a dish-type antenna.

Oftentimes, a parabolic reflecting element constituting the main part of an antenna has associated therewith a smaller subreflector which must be accurately positioned with respect to the main parabolic reflector.

Briefly, the present invention contemplates a relatively simple arrangement which is compact, rugged and precise for accurately adjusting the subreflector in any one of three mutually perpendicular directions and to maintain the adjustment once the adjustment has been performed.

It is, therefore, a general object of the present invention to provide an improved arrangement incorporating the above-indicated features for accomplishing the above-indicated results.

A specific object of the present invention is to provide a subreflector-positioning arrangement which is particularly useful in the positioning of a subreflector associated with a large, main parabolic reflector having, for example, a diameter of 25 feet.

Another specific object of the present invention is to provide an arrangement of this character in which electrical linear actuators are used for positioning the subreflector in any one of three mutually perpendicular directions or axes.

Another specific object of the present invention is to provide an arrangement of this character whereby position readout means embodying, for example, sensitive linear potentiometer-type resistances may be incorporated.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 illustrates a subreflector mounted with respect to its main parabolic reflector, the parabolic reflector being shown in section;

FIGURE 2 illustrates in enlarged form the subreflector-adjusting mechanism shown in FIGURE 1 with the subreflector and some of the supporting elements being illustrated in section;

FIGURE 3 is a perspective view of the subreflector-adjusting mechanism illustrated in FIGURES 1 and 2.

Referring to FIGURE 1, the dish-type antenna 10 includes a main parabolic reflector 11 and a subreflector 12 which is adjustably supported with respect to the main reflector 11 by a mechanism indicated by the general reference numeral 14, such mechanism 14 being mounted in a frame 15, the frame 15 being secured by a plurality of spars 16 to the supporting structure of the main reflector 11.

The frame 15 includes eight channel members 18 arranged in an octagonal pattern from which bracket members or plates 20 extend. These bracket members or plates 20 are provided with stiffening and mounting flanges whereby the same may be secured to the channel members 18 and to a centrally disposed ring-shaped member 21 having its central apertured portion closed by a cover member 22.

The adjusting mechanism 14 includes an outer rectangular frame member 30 which is secured to ends of the plate or rib members 20 and thus for purposes of the following description the frame member 30 may be considered as a stationary element together with the supporting structure 15, spars 16 and main reflector 11. The two vertical legs 30A, 30B of frame member 30 each have a ground and polished steel shaft 31, 32 secured thereto serving as a guide structure for a plate structure 34, such plate structure 34 having, at each one of its four corners, an open-type ball bushing 34a cooperating with the corresponding shaft 31, 32 to thereby achieve smooth, linear movement when the ball bushings ride on the ground and polished steel shafts. The use of such open-type ball bushings, each having a longitudinal section removed from its circumference, provides good rigidity and antifriction qualities without substantially any shaft deflection.

Thus, supporting plane 34 is movable to different adjusted vertical positions by a linear actuator 36 having its frame portion 36A pivotally mounted on an inverted V-shaped bracket 30D extending upwardly from the frame member 30, the movable element 36B of actuator 36 being pin-connected to a centrally located extension 34C of plate 34.

In like manner, a second plate structure 38 is slidably mounted on plate structure 34 using a like pair of ground and polished steel shafts 40 and 41 cooperating with an open-type ball bushing 38A at each corner of such plate structure 38. Such bearing constructions may be of the type made by Thomson Industries, Inc. of Manhasset, N.Y., its open type ball bushings Series "OPN."

The plate structure 38 is movable in a horizontal or lateral direction and such guide shafts 40, 41 using a like linear actuator 45 which has its casing 45A pivotally secured to a bracket 34E on plate structure 34 and which has its movable shaft or rod 45B pin-connected to a bracket 38E on plate structure 38.

An elongated bearing structure 50 is secured to a central portion of the plate 38 and the subreflector-supporting shaft 52 is slidably mounted in this bearing 50.

As seen in FIGURE 2, the forward end of shaft 52 extends into a socket portion of the subreflector 12 and is secured thereto by a bolt 60 which also serves to fasten an accordion or bellows-type of material 62, the other ends of the bellows material 62 being secured to the frame member 30 to thereby provide an expansible cover. The rear end of shaft 52, as seen in FIGURE 3, is provided with a bracket 52A to which is pin-connected the movable element 54B of actuator 54 having its casing 54A pin-connected to a bracket 38F of plate 38.

It will be seen from the foregoing description that the subreflector 12 may be moved and positioned in any one of three mutually perpendicular directions, the linear actuator 36 being used for vertical adjustment, the linear actuator 45 being used for lateral or horizontal adjustment and the third actuator 54 being used for axial adjustment. Each of these three linear actuators is of conventional construction and may be of a type manufactured by, for example, Airesearch Manufacturing Company or Airborne Accessories Corporation, so as to incorporate an integral magnetic brake and nonjamming mechanical stops. The linear actuators are such that when an actuating force is developed, the magnetic brake portion is released and conversely, when no actuating force is being developed, i.e., the parts are stationary, the magnetic brake is automatically applied to assure such stationary condition.

It will also be appreciated that travel limit switches and mechanical stops may be provided for each axis of movement and that position readout may be provided at a remote location. For this latter purpose, sensitive linear potentiometers, exemplified by the potentiometer 60, may be provided for each of the three axes with one movable portion of the potentiometer 60 being mounted on shaft 52 and the other relatively movable portion of potentiometer 60 being secured to the plate 38 or bearing 50. The movable tap of such potentiometer may be connected to a suitable readout device such as, for example, a digital voltmeter to provide remote indication of the relative position of the subreflector in relation to the central axis of the main reflector.

Using an arrangement of this character, movements of the order of two inches along each axis may be obtained.

I claim:
1. In an antenna structure, a frame structure, a first carriage structure; means slidably mounting said first carriage structure on said frame structure for movement of said carriage structure in a first direction; a second carriage structure; means slidably mounting said second carriage structure on said first carriage structure for movement in a second direction which is substantially perpendicular to said first direction; a subreflector supporting structure; means slidably mounting said supporting structure on said second carriage structure for movement in a direction which is substantially mutually perpendicular to said first direction and said second direction; means connecting said subreflector to said supporting structure; a first linear actuator interconnected between said frame structure and said first carriage structure; a second linear actuator interconnected between said first and second carriage structures; a third linear actuator interconnected between said third carriage structure and said subreflector supporting structure, said frame structure being an open rectangular structure having four side members, two of which extend parallel and a third and fourth of which interconnect said two side members; guide means on each of said two side members; guide means on said first carriage structure and cooperating with said guide means; said first linear actuator being interconnected between said third side member and said first carriage structure.

2. In an antenna structure, a frame structure, a first carriage structure; means slidably mounting said first carriage structure on said frame structure for movement of said carriage structure in a first direction; a second carriage structure; means slidably mounting said second carriage structure on said first carriage structure for movement in a second direction which is substantially perpendicular to said first direction; a subreflector supporting structure; means slidably mounting said supporting structure on said second carriage structure for movement in a direction which is substantially mutually perpendicular to said first direction and said second direction; means connecting said subreflector to said supporting structure, a first linear actuator interconnected between said frame structure and said first carriage structure; a second linear actuator interconnnected between said first and second carriage structures; a third linear actuator interconnected between said third carriage structure and said subreflector supporting structure; guide means on said frame structure; guide means on said first carriage structure and cooperating with said guide means on said frame structure; said first linear actuator being interconnected between said frame structure and said first carriage structure; said guide means between said subreflector supporting structure and said second carriage structure including a bearing centrally disposed with respect to said frame structure and first and second carriage structures and mounted in said second carriage structure; and a rod mounting said subreflector extending through said bearing and said first and second carriage structures and also through said frame structure.

3. An antenna structure as set forth in claim 1 in which the guide means between said subreflector supporting structure and said second carriage structure includes a bearing centrally disposed with respect to said frame and first and second carriage structures and mounted on said second carriage structure; and a rod mounting said subreflector extending through said bearing and said first and second carriage structures and also through said frame structure.

References Cited

UNITED STATES PATENTS

| 2,625,074 | 1/1953 | Nistri | 248—287 X |
| 2,691,313 | 10/1954 | Olson | 248—287 |

FOREIGN PATENTS 632,261  1/1928  France.

CHANCELLOR E. HARRIS, *Primary Examiner.*

U.S. Cl. X.R.

248—419